April 2, 1935. W. WUERFEL 1,996,603
METHOD OF MAKING PISTON RINGS
Original Filed Dec. 18, 1929 2 Sheets-Sheet 1
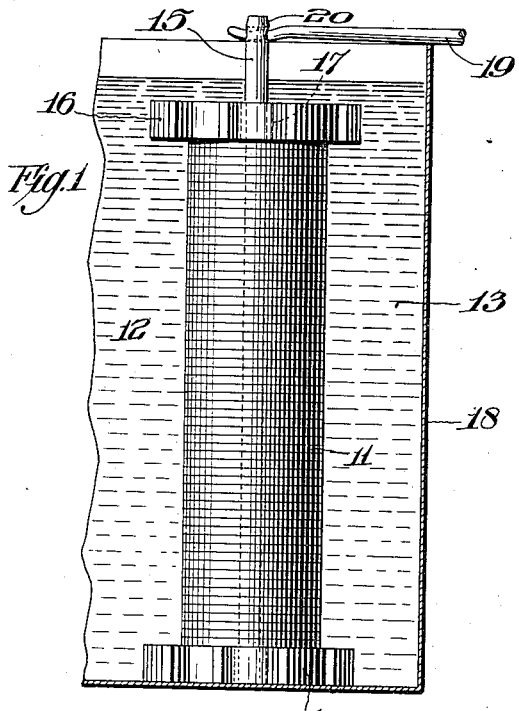
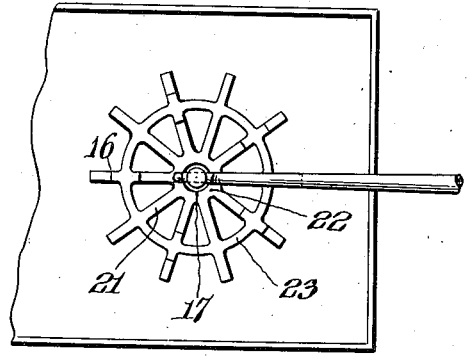
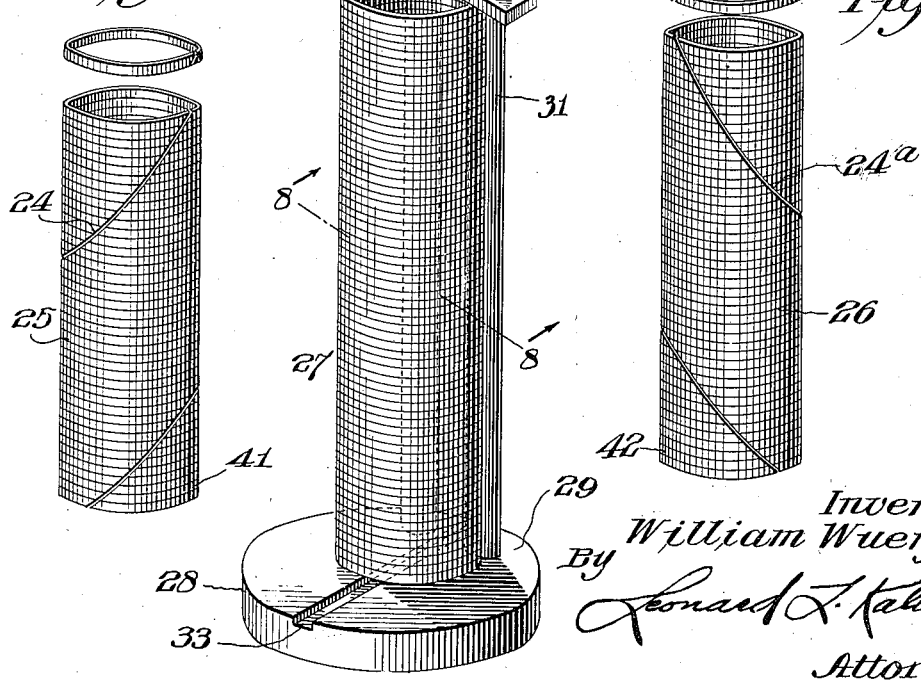
Inventor
William Wuerfel,
By Leonard L. Kalish
Attorney.

April 2, 1935.   W. WUERFEL   1,996,603
METHOD OF MAKING PISTON RINGS
Original Filed Dec. 18, 1929   2 Sheets-Sheet 2
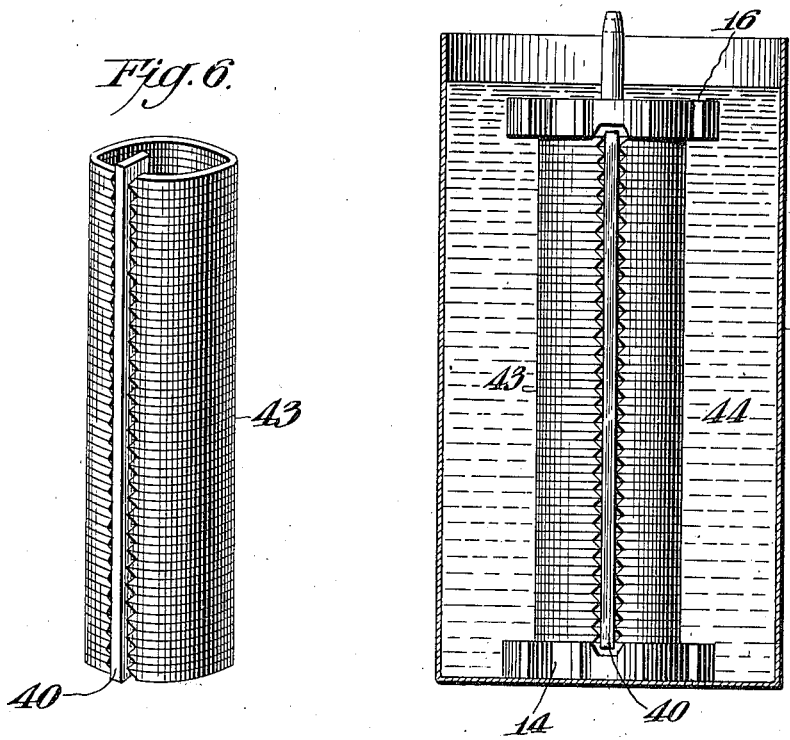
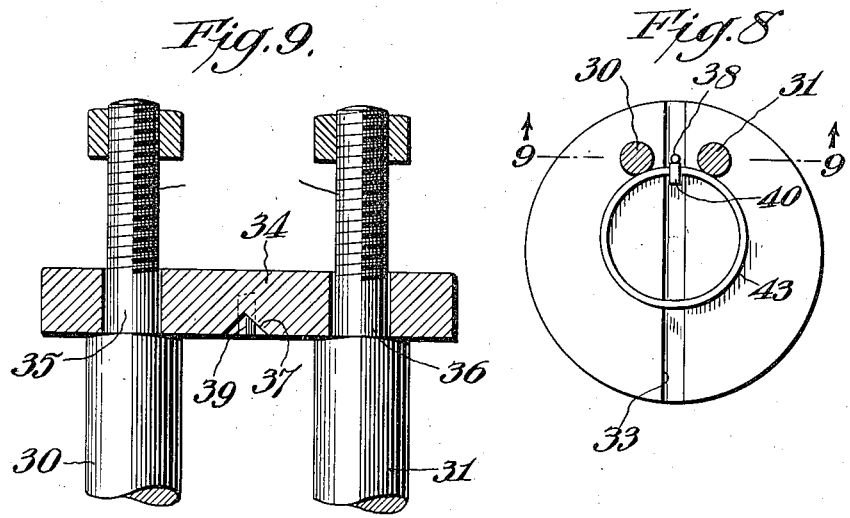
Inventor
William Wuerfel,
By Leonard L. Kalish
Attorney.

Patented Apr. 2, 1935

1,996,603

UNITED STATES PATENT OFFICE 1,996,603

METHOD OF MAKING PISTON RINGS

William Wuerfel, Philadelphia, Pa., assignor to Wilkening Manufacturing Company, Philadelphia, Pa., a corporation of Delaware Application December 18, 1929, Serial No. 415,064
Renewed November 6, 1933

20 Claims. (Cl. 29—156.6)

My invention relates to a new and useful piston ring and process of making the same, of the split annular cast iron type generally adapted for use in internal combustion engines or the like.

My invention relates more particularly to novel process steps or method steps in the manufacture of piston rings, whereby the piston rings are subjected to an initial stress-removing process, in advance of certain machining operations, so that a more perfect and truer ring might be produced in the end.

My invention further relates to process or method steps, whereby the rings may be set more truly and more accurately in an expanded condition, so that when the rings are compressed or contracted, as in use, they will produce more uniform outward radial pressure against the cylinder walls and will maintain a truer shape throughout.

My invention further relates to a certain novel apparatus especially adapted for carrying out my process with the utmost accuracy and facility.

For the purpose of illustrating my invention I have shown in the accompanying drawings forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings, in which like reference characters indicate like parts, Figure 1 represents a front elevation of a stack of rings as they are being subjected to the initial stress-removing step of my novel process.

Figure 2 represents a top plan view of the same.

Figure 3 represents a perspective view of the novel setting-up frame of my novel construction, adapted for assembling the rings into a uniform stack in the expanded condition, preparatory to one of the steps of my process.

Figure 4 represents a stack of piston rings, which have been split by an angular cut through the stack running in one direction.

Figure 5 represents a perspective view of a similar stack of rings which has been split by an angular cut running in the opposite direction.

Figure 6 represents a perspective view of a stack of rings mounted upon a spacing bar, in the condition in which they are assembled in the frame shown in Figure 3.

Figure 7 represents a front elevation of a stack of cut rings as they are being subjected to another step of my novel process.

Figure 8 represents a horizontal sectional view, taken generally on line 8—8 of Figure 3, showing the construction of the stack assembling frame, and the manner in which the rings are positioned thereon.

Figure 9 represents a partial sectional view on line 9—9 of Figure 8.

I have found, in the manufacture of piston rings, that one of the heretofore unrecognized causes of inaccuracy in the finished piston ring, is a certain slight distortion which the piston rings take on, immediately following, and as a consequence of a machine operation during the manufacture of the ring.

This slight ultimate distortion of the rings, causing them to vary perceptibly from a true form, is due to the original internal stresses present in the cast iron of which the piston rings are formed, whether such rings are formed of individual castings or whether such rings are formed of what is known as "pot castings". Thus under ordinary or usual methods of casting, commonly employed, certain strains and stresses are present in the body of cast iron forming the ring. With each machining operation, including the removal of some of the metal, or when the continuity of the ring is broken by cutting or fracturing the ring at one point, a certain amount of the internal stress or strain is released, with the result that after such machining operation, or "splitting" of the ring, the ring takes a minutely different set or shape. This holds true while the ring is being faced on its two flat surfaces and also while the outside and inside cylindrical surfaces of the rings are turned. The greatest difference in set probably takes place however, when the ring is split, either by cutting with a saw, milling tool or the like, or by fracturing the ring at one point. When the ring is thus split or broken at one point for the purpose of permitting radial expansion, any remaining internal stress or strain in the metal has a tendency, and in a great percentage of rings, does definitely distort the ring to an extent that is even perceptible to the naked eye. Thus, when the ring is finally cut or split, the theretofore true cylindrical outer surface of the ring may be distorted to an extent sufficient adversely to affect the ultimate sealing quality of the ring.

The first step of my novel process therefore consists in subjecting the uncut, "un-split" or the otherwise unfinished rings 11, to an initial stress-removing step or process, whereby such "un-split"

or uncut, or otherwise unfinished rings 11 are mounted in a suitable stack 12 or the like, and are immersed in a heating bath 13, as shown in Figure 1. The rings are thus subjected to an initial stress-removing process, preparatory to a finishing operation, machining operation or the "splitting" of the ring; said initial stress-removing process consisting in subjecting such rings to the action of the heat in a substantially unrestrained condition, where the rings might be substantially free to assume their natural shape while under the influence of the heat.

In Figure 1 of the drawings I have illustrated a means for subjecting the rings to the action of heat for the initial stress-removing step of my process, a condition which will allow the rings substantial freedom in assuming their natural or stress-free shape. The particular means illustrated in Figure 1 consists of a bottom plate 14, of cast iron or the like, having a vertical rod 15 anchored therein, and a top flange 16, having a central aperture 17 therein, superimposed upon the stack 12 mounted on the bottom flange 14. The only pressure thus exerted upon the rings 11 in the stack 12, is the weight of the top flange 16, and the weight of the successive rings. The rings however, are not clamped by any clamping device, such as a bolt and nut or the like, which would substantially restrain or confine the rings, while under the action of the heat. The group of rings 12 thus or similarly mounted in an unrestrained condition, are then lowered into a heating bath 13 of any suitable material (molten salt or the like) contained within a suitable vat or other container 18, and are allowed to remain there for a period of time sufficient to permit the rings to assume their normal condition or shape. A suitable handle or lifting rod 19 may be provided, for raising the group of rings 12. The rod 19 is merely inserted into an aperture 20 in the top of the rod 15, when it is desired to insert the group of rings 12 into the bath or to remove the same from the bath. Other means of heating, such as a furnace, may be employed instead of a heating bath.

In Figure 1 I have not shown the particular means for maintaining the rings 11 in alignment in the stack 12, but any suitable means may be employed for this purpose, as for instance suitable vertical guides mounted on the bottom flange 14.

For the purpose of permitting freer ingress and egress of the heating medium, such as the heating bath or liquid 13 into and from the interior of the stack 12, or the stack of rings shown in Figure 7 of the drawings at a subsequent stage of my process, I may form the top and bottom flanges 14 and 16 in the form of an open spider shown in Figure 2, consisting of a series of radial spokes 21 extending from a central hub 22 which contains the central aperture 17, and an annular connecting web 23, connecting the successive radial spokes or ribs.

While for the purpose of illustrating this initial stress-removing step of my process, I have herein shown and referred to a "stack" of uncut rings, maintained in an unrestrained condition, yet this initial stress-removing step of my process can be carried out with the rings subjected to the action of the heat in any other manner (other than the "stack" formation), so long as the rings are not clamped and are wholly or substantially unrestrained while under the influence of the heat.

The second part of my novel process then consists in imparting a uniform outward radial tension to the rings, that is, in setting the rings in an expanded condition relative to the circular shape thereof;—this latter step of my novel process being characterized by the imposition of but a single force upon the ring in the direction of the expansion and the elimination of all other restraining forces while the ring is being subjected to this step of the process.

In carrying out this second part of my process I first break the continuity of the ring, that is I "split" the ring at one point, preferably by cutting the ring at a suitable angle, so as, at the same time, to produce angularly overlapping ends on the finished ring.

I may cut the rings by an angular saw cut 24, of any suitable angle, such as an angle of 45°, run through the rings 25, while suitably clamped and mounted in a suitable fixture, not shown in the drawings, or I may "split" the rings by any suitable cut, such as a right angular cut or a "step-cut" or the like.

I also preferably cut some of the rings by a right-handed angular cut 24, as shown in Figure 4, and some of the rings by a left-handed angular cut 24—a, as shown on the stack of rings 26 in Figure 5.

For this second part of my novel process I provide a setting-up frame designated generally by the numeral 27, consisting of a base plate 28 of any suitable size, having a plane upper surface 29, and having mounted thereon a pair of parallel spaced vertical bars 30 and 31, having their upper ends provided with a reduced diameter screw thread to receive nuts 32.

A channel 33 of suitable depth and width is extended across the upper surface 29 of the base plate 28, on a line perpendicular to the common center line of the two vertical rods 30 and 31, and spaced equidistantly therefrom.

A transverse yoke 34 is provided on the upper ends 35 and 36, of the vertical guide rods 30 and 31. The transverse yoke member 34 is similarly provided with a groove or channel 37, extending parallel to the groove or channel 33 in the base plate, and being likewise equidistantly spaced from the two guide rods 30 and 31. Suitable and similar gauge pins 38 and 39 may be provided in the grooves 33 and 37 respectively at corresponding points, as indicated in Figures 2, 8 and 9.

A generally flat, rectangular spacing bar 40 is provided, of a width or thickness depending upon the amount of expansion required by the particular size ring.

The spacing bar 40 is mounted vertically in the set-up frame 27, parallel to the two guide rods 30 and 31 and spaced generally intermediate thereof and equidistant therefrom, as indicated in Figure 8. The lower end of the spacing bar 40 is set into the lower groove 33, abutting the gauge pin 38, as indicated in Figure 8, while the upper end of the spacing bar 40 is set into the upper groove 37, also preferably abutting the gauge pin 39, so as to insure the generally parallel relation of said spacing bar 40 to the guide rods 30 and 31. The yoke 34 then secured by the clamping nuts 32, serves to retain the spacing bar 40 in position while the rings are mounted thereon.

Rings 41 and 42 are then preferably taken alternately from the two oppositely cut stacks 25 and 26 respectively (Figures 4 and 5) and are mounted alternately on the spacing bar 40 in the set-up frame 27 (Figures 3 and 8) by spreading the rings apart at the split sufficiently to straddle the width of the spacing bar 40 and then allowing the ends of the rings to close in on the spacing bar 40 by the tension occasioned by the expansion of the rings.

A stack of rings 43 is thus produced. The tension of each ring, occasioned by the expansion thereof, is sufficient to retain the ring on the spacing bar 40, and the rings may thus be removed from the setting-up frame 27 in the form of a stack held together by the spacing bar 40.

The stack of expanded rings 43 is then placed upon the bottom spider member 14 (shown in Figure 7) and the top spider member 16 is then superimposed upon the stack 43, merely to prevent the upper rings from twisting on the spacing bar and becoming loose on the stack.

The stack of rings 43, thus unclamped and unrestrained, is immersed into the heating bath 44, in any suitable vat or container 45 (shown in section). The temperature of the bath 44 and the length of time the stack 43 is immersed, is adjusted so that the rings are permanently set in their expanded condition free of any strain or stress in said expanded condition. The rings are then removed from the heating bath and allowed to cool, or they may be cooled by immersion in a suitable cooling bath.

The rings may then be removed from the spacing bar 40.

The finished product thus produced is a piston ring which will not only exert a uniform outward radial pressure when compressed into the operative position within the cylinder walls, but one which will possess a true shape and will maintain such shape throughout its normal life and will be possessed with the maximum sealing qualities by reason of such truer shape.

The two main parts of my process, to wit, the initial stress-removing step in advance of a machining operation or the splitting of the ring, or what is here generally designated as a "finishing" operation, and the setting of the ring in the expanded condition may be carried out separately. The term "finishing" has been used herein and in the claims forming a part herein to designate broadly a machining operation or the splitting of the ring.

Both of the two main parts of my process are characterized by the fact that in each case the rings are subjected to the action of heat in a substantially unrestrained or "un-clamped" condition whereby the rings may set in what may be termed their normal position or shape in each instance.

While the particular apparatus shown for carrying out the initial stress-removing step of my process may be conveniently employed for such purposes, yet any other suitable means may be used for subjecting the rings to the action of heat in a substantially unrestrained condition.

The particular means or apparatus herein disclosed for carrying out the second main part of my novel process, to wit the setting of the rings in the expanded condition, including the set-up frame, spacing bar, and the top and bottom flanges or spiders and intermediate rod for supporting the stack of cut and expanded rings in an aligned but yet substantially unrestrained condition, have been found by me to give efficient and desirable results in carrying out the second main part of my process and are hence preferable for this reason, although this apparatus may be varied;—the essence of this part of my invention being to "heat-set" the rings in an expanded condition while said rings are supported or guided on both sides or sidewise, so as to retain them in general plane parallel alignment and thus to prevent their twisting due to the expanding forces, while heating; without restraining or clamping the rings however to any substantial extent, as would tend to restrain the rings radially or tend to set up internal stresses and strains in the finished product when in use.

I am aware that my invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention what I claim as new and desire to secure by Letters Patent, is:—

1. The method of making piston rings which consists in splitting the rings at one point in their circumference, expanding the thus split rings to a suitable extent, by opposed forces exerted upon the ends of the thus split rings, supporting said rings on both sides thereof and generally around their entire circumference, without exerting any substantial axial pressure on the rings as would tend to clamp or restrain the same, and subjecting the expanded rings to the action of heat, while said rings are in a side-supported and substantially unrestrained condition and free of all substantial external forces other than the expanding forces, thereby to set the rings in the expanded condition.

2. The method of making piston rings which consists in splitting the rings at one point in their circumference, expanding the thus split rings to a suitable extent by opposed forces exerted upon the ends of the thus split rings, supporting said rings on both sides thereof, and generally around their entire circumference, without exerting any substantial axial pressure on the rings as would tend to clamp or restrain the same, subjecting the expanded rings to the action of heat while said rings are in a side-supported and substantially unrestrained condition and free of all substantial external forces other than said expanding forces, and lastly cooling said rings.

3. The method of making piston rings which consists in splitting the rings, expanding the rings to a suitable extent by suitable forces applied to the split ends of the rings, and heating the thus expanded rings while in a generally uniformly side-supported and yet substantially unrestrained condition, thereby to set the rings in the expanded condition free of any substantial internal stresses.

4. The method of making cast-iron piston rings which consists in splitting initially closed annular cast-iron rings at one point in their circumference so as to permit a radial expansion of the rings, expanding the rings radially to a suitable extent, by suitable expanding forces, supporting the rings sidewise generally around their entire circumferences sufficiently to prevent twisting of the rings due to said expanding forces, without however exerting any substantial axial force upon the rings as would tend to clamp the rings and tend thereby to restrain them radially, and subjecting the split and expanded rings to the action of heat while in said side-supported and yet unclamped condition, sufficiently to set the rings in an expanded condition free of any substantial internal stress or strain.

5. The method of making piston rings which consists in splitting the rings, expanding said rings to a suitable extent by suitable forces applied to the split ends of the rings, forming a stack of the thus expanded rings, with adjacent rings being in substantially contiguous relation to each other generally throughout their entire circumference, and heating said stack of expanded rings in a substantially unrestrained condition.

6. The method of making piston rings which consists in splitting some of the rings by an angular cut inclined in one direction and splitting others of said rings by an angular cut inclined in the other direction, expanding said rings to a suitable extent by forces applied to the split ends of the rings, forming a stack of said expanded rings with the oppositely cut rings alternating with each other, and with adjacent rings in contiguous relation to each other generally throughout their entire circumference, and heating said stack of rings in a substantially unrestrained condition to set the same in the expanded condition thereof.

7. The method of making piston rings which consists in splitting the rings, expanding said rings to a suitable extent by forces applied to the split ends of the rings, mounting a plurality of said expanded piston rings upon a common spacing bar in a stack formation, with adjacent rings in contiguous relation to each other generally throughout their entire circumference, and heating said stack of expanded piston rings upon said spacing bar.

8. The method of making piston rings which consists in splitting the rings, expanding said rings to a suitable extent by forces applied to the split ends of the ring, mounting a plurality of said expanded piston rings upon a common spacing bar having substantially plane parallel spacing surfaces, in a stack formation, with adjacent rings in contiguous relation to each other generally throughout their entire circumference, and heating said stack of expanded piston rings upon said spacing bar.

9. The method of making piston rings which consists in splitting the rings, expanding said rings to a suitable extent by forces applied to the split ends of the ring, mounting a plurality of said expanded piston rings upon a common spacing bar in a stack formation, with adjacent rings in contiguous relation to each other generally throughout their entire circumference, and heating said stack of expanded piston rings upon said spacing bar in a substantially unrestrained condition.

10. The method of making piston rings which consists in splitting the rings, expanding said rings to a suitable extent by forces applied to the split ends of the rings, mounting a plurality of said expanded piston rings upon a common spacing bar having substantially plane parallel spacing surfaces, in a stack formation, with adjacent rings in contiguous relation to each other generally throughout their entire circumference, and heating said stack of expanded piston rings upon said spacing bar in a substantially unrestrained condition.

11. The method of making a piston ring which consists in subjecting the ring to an initial stress-removing process consisting of heating the ring in a substantially unrestrained condition, prior to a final machining operation, thereafter splitting the ring, expanding said ring by suitable forces applied to the split ends of the ring, to a suitable extent, and heating said expanded ring in a generally uniformly side-supported and substantially unrestrained condition, to set the same in the expanded condition thereof.

12. The method of making piston rings which consists in splitting the rings, expanding the rings to a suitable extent by suitable tangential forces applied to the split ends of the rings, and heating the thus expanded rings while in a generally uniformly side-supported and yet substantially unrestrained condition, thereby to set the rings in the expanded condition free of any substantial internal stresses.

13. The method of making piston rings which consists in splitting the rings, expanding said rings to a suitable extent by suitable tangential forces applied to the split ends of the rings, forming a stack of the thus expanded rings with adjacent rings being in substantially contiguous relation to each other generally throughout their entire circumference, and heating said stack of expanded rings in a substantially unrestrained condition.

14. The method of making piston rings which consists in splitting some of the rings by an angular cut inclined in one direction and spliting others of said rings by an angular cut inclined in the other direction, expanding said rings to a suitable extent by tangential forces applied to the split ends of the rings, forming a stack of said expanded rings with the oppositely cut rings alternating with each other and with adjacent rings in contiguous relation to each other generally throughout their entire circumference, and heating said stack of rings in a substantially unrestrained condition to set the same in the expanded condition thereof.

15. The method of making piston rings which consists in splitting the rings at one point in their circumference, expanding the thus split rings to a suitable extent, by opposed tangential forces exerted upon the ends of the thus split rings, supporting said rings on both sides thereof and generally around their entire circumference, without exerting any substantial axial pressure on the rings as would tend to clamp or restrain the same, and subjecting the expanded rings to the action of heat, while said rings are in a side-supported and substantially unrestrained condition and free of all substantial external forces other than the expanding forces, thereby to set the rings in the expanded condition.

16. The method of making piston rings which consists in splitting the rings, expanding said rings to a suitable extent by tangential forces applied to the split ends of the rings, mounting a plurality of said expanded piston rings upon a common spacing bar in a stack formation, with adjacent rings in contiguous relation to each other generally throughout their entire circumference, and heating said stack of expanded piston rings upon said spacing bar.

17. The method of making piston rings which consists in splitting the rings, expanding said rings to a suitable extent by tangential forces applied to the split ends of the ring, mounting a plurality of said expanded piston rings upon a common spacing bar having substantially plane parallel spacing surfaces, in a stack formation, with adjacent rings in contiguous relation to each other generally throughout their entire circumference, and heating said stack of expanded piston rings upon said spacing bar.

18. The method of making piston rings which consists in splitting the rings, expanding said rings to a suitable extent by tangential forces applied to the split ends of the ring, mounting a plurality of said expanded piston rings upon a common spacing bar in a stack formation, with adjacent rings in contiguous relation to each other generally throughout their entire circumference, and heating said stack of expanded piston rings upon said spacing bar in a substantially unrestrained condition.

19. The method of making piston rings which consists in splitting the rings, expanding said rings to a suitable extent by tangential forces applied to the split ends of the rings, mounting a plurality of said expanded piston rings upon a common spacing bar having substantially plane parallel spacing surfaces, in a stack formation, with adjacent rings in contiguous relation to each other generally throughout their entire circumference, and heating said stack of expanded piston rings upon said spacing bar in a substantially unrestrained condition.

20. The method of making a piston ring which consists in subjecting the ring to an initial stress-removing process consisting of heating the ring in a substantially unrestrained condition, prior to a final machining operation, thereafter splitting the ring, expanding said ring by suitable tangential forces applied to the split ends of the ring, to a suitable extent, and heating said expanded ring in a generally uniformly side-supported and substantially unrestrained condition, to set the same in the expanded condition thereof.

WILLIAM WUERFEL.